(12) United States Patent
Kemery (10) Patent No.: US 8,825,036 B2
(45) Date of Patent: Sep. 2, 2014

(54) PARENT TELECOMMUNICATION DEVICE CONFIGURATION OF ACTIVITY-BASED CHILD TELECOMMUNICATION DEVICE

(75) Inventor: Michael Kemery, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 126 days.

(21) Appl. No.: 12/544,881

(22) Filed: Aug. 20, 2009

(65) Prior Publication Data

US 2011/0045811 A1     Feb. 24, 2011

(51) Int. Cl.
 *H04M 3/00*     (2006.01)
(52) U.S. Cl.
 USPC .......................... 455/420; 455/418; 455/419
(58) Field of Classification Search
 CPC ................ H04M 1/72563; H04M 1/72577
 USPC .................................... 455/418, 420
 See application file for complete search history.

(56) References Cited

U.S. PATENT DOCUMENTS

| | | | |
|---|---|---|---|
| 5,023,907 A | 6/1991 | Johnson et al. | |
| 6,767,212 B2 | 7/2004 | Thomas | |
| 6,889,212 B1 | 5/2005 | Wang et al. | |
| 7,046,139 B2 | 5/2006 | Kuhn et al. | |
| 7,113,981 B2 * | 9/2006 | Slate ............................ | 709/217 |
| 7,218,912 B2 | 5/2007 | Erskine et al. | |
| 7,302,272 B2 | 11/2007 | Ackley | |
| 7,415,711 B2 | 8/2008 | Chew et al. | |
| 2001/0018660 A1 | 8/2001 | Sehr | |
| 2002/0099552 A1 | 7/2002 | Rubin et al. | |
| 2002/0156792 A1 | 10/2002 | Gombocz et al. | |
| 2003/0078036 A1 | 4/2003 | Chang et al. | |
| 2004/0166878 A1 | 8/2004 | Erskine et al. | |
| 2004/0180648 A1 | 9/2004 | Hymel et al. | |
| 2004/0235520 A1 | 11/2004 | Cadiz et al. | |
| 2005/0096009 A1 | 5/2005 | Ackley | |
| 2005/0125819 A1 | 6/2005 | Ono et al. | |
| 2005/0278637 A1 | 12/2005 | Youm et al. | |
| 2006/0101499 A1 | 5/2006 | Aravamudan et al. | |
| 2006/0121428 A1 | 6/2006 | Terrazas | |
| 2006/0122938 A1 | 6/2006 | Hicks et al. | |
| 2006/0143047 A1 | 6/2006 | Briegs et al. | |
| 2006/0143622 A1 | 6/2006 | Prabandham et al. | |
| 2006/0189348 A1 | 8/2006 | Montulli et al. | |

(Continued)

FOREIGN PATENT DOCUMENTS

KR     20010096407     11/2001
KR     20020066804      8/2002

(Continued)

OTHER PUBLICATIONS

Oomble.com, "Frequently Asked Questions", Last Revised Aug. 22, 2007, Retrieved from http//web.archive.org/web/20080122014735/www.oomble.com/public/faq.jsp on Jan. 18, 2011, 12 pages.

(Continued)

*Primary Examiner* — Mazda Sabouri
(74) *Attorney, Agent, or Firm* — Lee & Hayes, PLLC (57) ABSTRACT

A telecommunications network offers a subscription plan or feature for parent and activity-based child devices. Configuration choices are made at the parent device and communicated to the activity-based child device. The child device creates a graphical menu showing activities as specified by the configuration information received from the parent device.

18 Claims, 7 Drawing Sheets

(56) References Cited

U.S. PATENT DOCUMENTS

| | | | |
|---|---|---|---|
| 2006/0194181 A1 | 8/2006 | Rosenberg | |
| 2006/0224943 A1 | 10/2006 | Snyder et al. | |
| 2006/0242242 A1 | 10/2006 | Ezumi et al. | |
| 2006/0255119 A1 | 11/2006 | Marchasin et al. | |
| 2006/0258341 A1* | 11/2006 | Miller et al. | 455/414.1 |
| 2006/0270395 A1 | 11/2006 | Dhawan et al. | |
| 2007/0006327 A1 | 1/2007 | Lal et al. | |
| 2007/0021145 A1 | 1/2007 | Lam | |
| 2007/0037562 A1* | 2/2007 | Smith-Kerker et al. | 455/418 |
| 2007/0037563 A1 | 2/2007 | Yang et al. | |
| 2007/0039025 A1 | 2/2007 | Kraft et al. | |
| 2007/0058637 A1 | 3/2007 | Lo | |
| 2007/0070404 A1 | 3/2007 | Caradec et al. | |
| 2007/0081075 A1 | 4/2007 | Canova et al. | |
| 2007/0099609 A1 | 5/2007 | Cai | |
| 2007/0127633 A1 | 6/2007 | Hertel et al. | |
| 2007/0198413 A1 | 8/2007 | Nagao | |
| 2007/0250382 A1 | 10/2007 | Beck | |
| 2008/0064381 A1 | 3/2008 | Ackley | |
| 2008/0070608 A1 | 3/2008 | Ackley | |
| 2008/0070609 A1 | 3/2008 | Ackley | |
| 2008/0096544 A1 | 4/2008 | McNamara et al. | |
| 2008/0096603 A1 | 4/2008 | Sparre | |
| 2008/0140433 A1 | 6/2008 | Levy et al. | |
| 2008/0162305 A1 | 7/2008 | Rousso et al. | |
| 2008/0181201 A1 | 7/2008 | Park et al. | |
| 2008/0209577 A1 | 8/2008 | Vrielink et al. | |
| 2008/0215494 A1 | 9/2008 | Corbett | |
| 2008/0233944 A1 | 9/2008 | Tu | |
| 2008/0246605 A1 | 10/2008 | Pfeffer et al. | |
| 2008/0256641 A1 | 10/2008 | Lo | |
| 2008/0288966 A1 | 11/2008 | Maes | |
| 2008/0299527 A1 | 12/2008 | Groot et al. | |
| 2008/0307324 A1 | 12/2008 | Westen et al. | |
| 2009/0005000 A1 | 1/2009 | Baker et al. | |
| 2009/0006116 A1 | 1/2009 | Baker et al. | |
| 2009/0006200 A1 | 1/2009 | Baker et al. | |
| 2009/0015653 A1 | 1/2009 | Baek | |
| 2009/0018963 A1 | 1/2009 | Abu-Amara | |
| 2009/0038005 A1 | 2/2009 | Howarth | |
| 2009/0054092 A1 | 2/2009 | Stonefield et al. | |
| 2009/0069084 A1 | 3/2009 | Reece et al. | |
| 2009/0106110 A1 | 4/2009 | Stannard et al. | |
| 2009/0143007 A1 | 6/2009 | Terlizzi | |
| 2009/0148824 A1 | 6/2009 | Argott | |
| 2009/0149205 A1* | 6/2009 | Heredia et al. | 455/466 |
| 2009/0199178 A1* | 8/2009 | Keller et al. | 718/1 |
| 2009/0209240 A1 | 8/2009 | Mahowald | |
| 2009/0225788 A1 | 9/2009 | Kephart et al. | |
| 2009/0254656 A1 | 10/2009 | Vignisson et al. | |
| 2009/0282005 A1 | 11/2009 | Kim et al. | |
| 2009/0317778 A1 | 12/2009 | Oberman | |
| 2010/0039254 A1 | 2/2010 | Cooper et al. | |
| 2010/0122170 A1 | 5/2010 | Girsch et al. | |
| 2010/0235476 A1 | 9/2010 | Lin et al. | |
| 2010/0241530 A1 | 9/2010 | Murset | |
| 2010/0299712 A1 | 11/2010 | Austin et al. | |
| 2010/0322234 A1 | 12/2010 | Kodaka | |
| 2011/0044438 A1 | 2/2011 | Wang et al. | |
| 2011/0065419 A1* | 3/2011 | Book et al. | 455/411 |
| 2011/0202863 A1 | 8/2011 | Corrallo | |
| 2012/0066088 A1 | 3/2012 | Murset | |
| 2014/0112458 A1 | 4/2014 | Wang et al. | |

FOREIGN PATENT DOCUMENTS

| | | |
|---|---|---|
| KR | 20060108093 A | 10/2006 |
| KR | 20070005163 A | 1/2007 |
| KR | 20070017229 A | 2/2007 |
| WO | WO2010008509 A2 | 1/2010 |

OTHER PUBLICATIONS

Beck, "An Allowance That's Measured in Minutes, Not Cents," retrieved at <<http://www.nytimes.com/2007/11/25/business/yourmoney/25allowance.html?_r=2&pagewanted=print>>, Nov. 25, 2007, 3 pgs.

"My Reward Board," retrieved at <<http://www.myrewardboard.com/>> on Mar. 24, 2010, available as early as Jan. 25, 2010, 1 pg.

Raffle, et al., "Family Story Play: Reading with Young Children (and Elmo) Over a Distance", CHI 2010, Apr. 10-15, 2010, Atlanta, Georgia, 10 pages.

Yarosh et al., "Developing a Media Space for Remote Synchronous Parent Child Interaction", IDC 2009, Jun. 3-5, 2009, Como, Italy, 10 pages.

PCT International Search Report and Written Opinion mailed Mar. 29, 2011 for PCT Application No. PCT/US10/45991, 10 pgs.

PCT International Search Report and Written Opinion mailed Apr. 15, 2011 for PCT Application No. PCT/US10/45722, 10 pgs.

Final Office Action for U.S. Appl. No. 12/544,464, mailed on Jun. 1, 2011, Michael Kernery, "Licensed Content Purchasing and Delivering".

PCT Search Report & Written Opinion mailed Jun. 27, 2011 for PCT Application No. PCT/US10/45996.

"AT&T Video Share Lets Wireless Customers Share Live Video", retrieved from: http://www.att.com/gen/press-room?pid=9199, printed on Feb. 26, 2009, 2 pages.

"Back to MediaCast FAQ", retrieved from: http://vumenow.com/support mediashare.php?faq=1, printed Feb. 26, 2009, 2 pages.

"Cingular to roll out video/chat service", The Seattle Times: Tech Tracks, retrieved from: http://blog.seattletimes.nwsource.com/techtracks/archives/2006/06/cingular to roll out vi . . . , Jun. 28, 2006, 2 pages.

GSM Association, "Image Share Interoperability Specification 1.1", Official Document IR.79, Apr. 10, 2008, 13 pages.

GSM Association, "Video Share Interoperability Specification 1.3", Official Document IR.74, Oct. 30, 2008, 18 pages.

PCT Search Report & Written Opinion mailed Oct. 27, 2011 for PCT Application No. PCT/US11/28527, 11 pages.

PCT Search Report & Written Opinion mailed Oct. 31, 2011 for PCT Application No. PCT/US11/28545, 8 pages.

PCT Search Report & Written Opinion mailed Nov. 30, 2011 for PCT Application No. PCT/US11/28371, 10 pages.

Final Office Action for U.S. Appl. No. 12/731,698, mailed on Jan. 23, 2013, Michael Kemery et al., "Chore and Rewards Tracker", 8 pages.

Non-Final Office Action for U.S. Appl. No. 12/731,717, mailed on Feb. 16, 2012, Winston Wang et al, "Shared Book Reading", 25 pages.

Non-Final Office Action for U.S. Appl. No. 12/732,103, mailed on Apr. 11, 2012, Marianna Wickman, et al., "Parent-Controlled Episodic Content on a Child Telecommunication Device", 10 pages.

Non-Final Office Action for U.S. Appl. No. 12/544,404, mailed on Apr. 26, 2012, Winston Wang et al, "Shareable Applications on Telecommunications Devices", 10 pages.

Final Office Action for U.S. Appl. No. 12/731,717, mailed on Aug. 16, 2012, Winston Wang et al, "Shared Book Reading", 16 pages.

Final Office Action for U.S. Appl. No. 12/732,103, mailed on Aug. 23, 2012, Marianna Wickman, et al., "Parent-Controlled Episodic Content on a Child Telecommunication Device", 13 pages.

Non-Final Office Action for U.S. Appl. No. 12/731,698, mailed on Aug. 30, 2012, Michael Kemery et al., "Chore and Rewards Tracker", 7 pages.

Final Office Action for U.S. Appl. No. 12/544,404, mailed on Oct. 19, 2012, Winston Wang et al, "Shareable Applications on Telecommunications Devices", 7 pages.

Non-Final Office Action for U.S. Appl. No. 12/544,464, mailed on Mar. 27, 2013, Michael Kernery, "Licensed Content Purchasing and Delivering", 11 pages.

Final Office Action for U.S. Appl. No. 12/544,464, mailed on May 23, 2013, Michael Kernery, "Licensed Content Purchasing and Delivering", 12 pages.

Final Office Action for U.S. Appl. No. 12/731,717, mailed on Feb. 6, 2014, Winston Wang et al, "Shared Book Reading", 17 pages.

Office Action for U.S. Appl. No. 12/544,464, mailed on Nov. 1, 2013, Michael Kemery, "Licensed Content Purchasing and Delivering", 13 pages.

(56) References Cited

OTHER PUBLICATIONS

Office Action for U.S. Appl. No. 12/732,103, mailed on Sep. 19, 2013, Wickman et al., "Parent-Controlled Episodic Content on a Child Telecommunication Device", 16 pages.

Office Action for U.S. Appl. No. 12/731,717, mailed on Sep. 23, 2013, Wang et al., "Shared Book Reading", 17 pages.

Office action for U.S. Appl. No. 12/731,717, mailed on Jun. 24, 2014, Wang et al., "Shared Book Reading", 10 pages.

* cited by examiner

PARENT TELECOMMUNICATION DEVICE CONFIGURATION OF ACTIVITY-BASED CHILD TELECOMMUNICATION DEVICE

BACKGROUND

In the last few years telecommunications devices, such as cellular phones, landline phones and IP-based phones, have become more and more capable, offering an increasing array of functions. Once limited to simple point-to-point voice communications, telecommunications devices have evolved into so-called "smart phones" that offer many different modes of telecommunication, such as voice, video, text messaging, instant messaging, email, and other modes of communication. Furthermore, modern smart phones have capabilities approaching those of more traditional desktop computers, including the ability to load and run third party applications. Applications are available for business use, as well as for personal use, education, and entertainment.

Many people view their telecommunications devices as critical to daily life: necessary for coordinating both business and personal activities. Among many families, cell phones, in particular, are becoming a primary means of communication, and more and more children have their own mobile devices. This allows parents to keep in touch with their children despite the hectic schedules of both parents and children.

The advanced capabilities of modern communications devices create a variety of educational opportunities, as well as opportunities for rich interactions between parents and children even when they are geographically separated. Unfortunately, these opportunities are accompanied by dangers such as the ability to access inappropriate materials and to communicate with virtually anyone in the world. Parents usually want to limit accessibility in order to protect their children from inappropriate content, activities, and communications.

Some telecommunications devices can indeed be configured to limit their communications capabilities. For example, a phone might be configured to accept telephone calls only from specified parties such as parents. Likewise, the phone might be configured to only allow certain outgoing calls. Access to content and activities can be similarly limited. However, these types of configuration choices are inflexible and mainly exclusionary. They do not allow the parent to participate in creating new experiences and learning opportunities for the child, and do nothing to facilitate or increase close interaction between parent and child.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
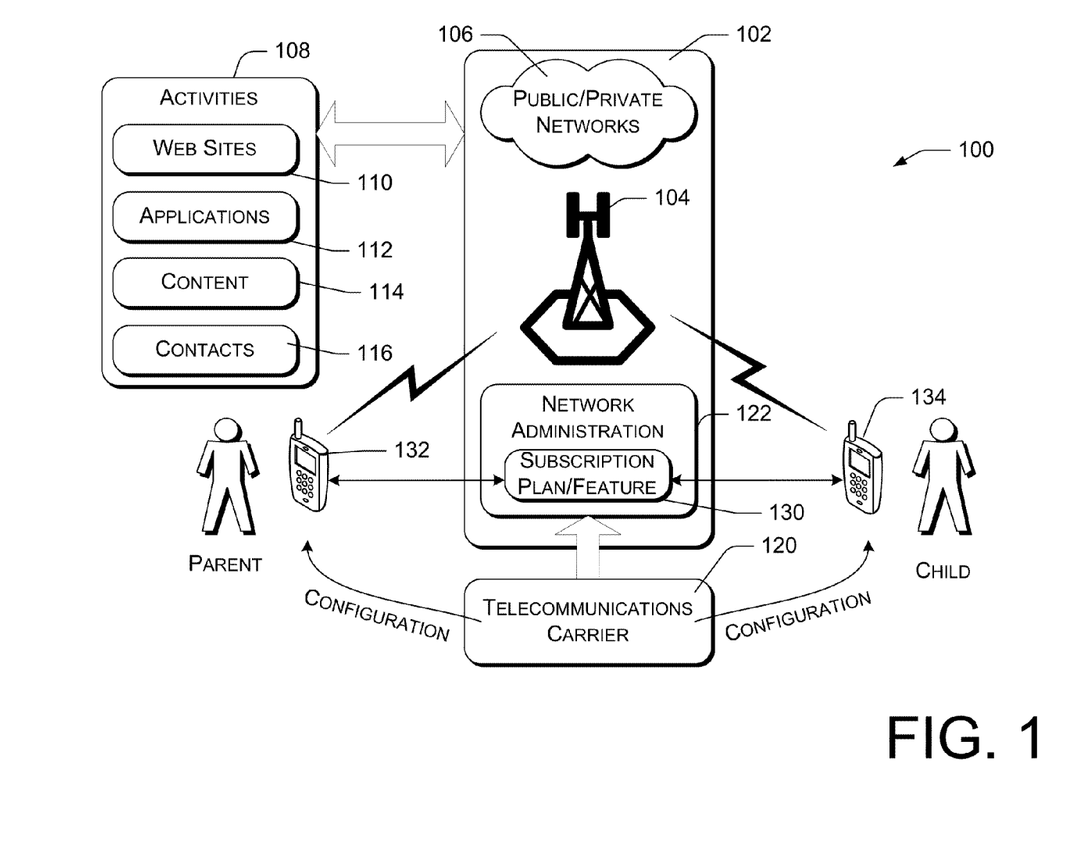
FIG. 1 is a block diagram of a telecommunications network and system including a parent device and a child device.

FIG. 1 illustrates a telecommunications system 100 that facilitates voice and other modes of communication between a parent device and an activity-based child device. Although the terms "parent device" and "child device" are used herein, a "parent device" is any type of device that can controls, either directly or via an alternate interface (such as a desktop or Web interface) the activities available to a user of a "child device", regardless of whether the specific users of the "parent device" and "child device" have a parent-child relationship. In the described example, system 100 is a cellular telecommunications system which is accessed by wireless communications devices such as portable telephone handsets, smart phones, PDA phones, pagers, portable computers, and various other types of portable devices having wireless communications capabilities. Telecommunications system 100 may be any other type of telecommunications system, such as a landline telecommunications system, an IP-based telecommunications system, or a converged telecommunications system (such as an Unlicensed Mobile Access or UMA system).

Telecommunications system 100 includes a network 102 which in turn comprises an infrastructure 104 (in this example, a cellular infrastructure) connected for communications with one or more private networks and/or one or more public networks (such as the Internet) 106. Telecommunications network 104 is represented by a cell tower commonly associated with a cellular telecommunications network, although other types of mobile technologies might also be used.

Originally intended to implement voice communications, cellular networks and other wireless communications systems now support many different types of communications, such as video, instant messaging, email, text messaging (e.g., Short Message Service or SMS messaging), multimedia messaging (e.g., Multimedia Message Service or MMS messaging), etc. Systems such as telecommunications system 100 may also provide access to the Internet. Modern telecommunication devices have advanced capabilities that allow them to utilize the wide range of resources and activities available through the Internet.

Telecommunications network 104 utilizes various technologies and protocols for implementing different modes of communications with and between telecommunications devices. Telecommunications network 104 supports voice communications as well as data communications. Telecommunications devices utilizing telecommunications network 104 can conduct various types of communications with other telecommunications devices supported by telecommunications network 104, as well as with devices and resources connected to private/public network(s) 106.

Numerous carriers maintain large communications networks as examples of telecommunications network 104. T-Mobile, as one example, is a large mobile network operator that maintains a world-wide wireless communications infrastructure. Other operators maintain independent mobile networks, and there is a degree of cooperation and interoperability between networks. At the least, users of one mobile network can call and communicate with users of different fixed, IP-based, mobile and converged networks. In addition, users can communicate with each other through various Internet communication techniques, made possible by the connection of the various mobile networks to the Internet.

By virtue of the connection of telecommunications network 104 to private/public network(s) 106, system 100 encompasses all the different resources available to users of such network(s), as well as other resources that might be made available exclusively to users of telecommunications network 104. For purposes of this description, these resources are categorized and shown in FIG. 1 as activities 108, and include any type of interactive activity capable of being performed with a telecommunications device, such as but not limited to interacting with web sites 110, using applications 112, accessing content 114, and placing or receiving voice calls, emails, instant messages or other modes of communication with contacts 116.

A web site 110 is a collection of related web pages or views, including text, graphics, images, videos, audio, or other content. A particular web site 110 is typically accessed by a URL or domain name. Applications 112 are programs that can be downloaded to a user's device and executed locally. Content 114 is static information or files that can be downloaded to a user's device and rendered locally. Pictures and music are examples of content that might be used in this way. Placing or receiving a voice call 116 is the ability to initiate or receive a telephonic voice communication from a person or entity with whom communications can be conducted over network 102. Each voice call is typically represented by a contact with address information such as a telephone number.

As mentioned, telecommunications network 104 is maintained by a carrier, which is represented in FIG. 1 as telecommunications carrier 120. Users of telecommunications network 104, also referred to as subscribers, purchase devices and telecommunication plans from carrier 120 in order to gain access to telecommunications network 104.

Devices used with telecommunications network 104 operate under network subscription plans that define the terms, features, and fees under which network use is granted. For example, a voice subscription plan might allow a predefined number of minutes per month of network voice call usage. A data subscription plan might indicate a predefined quantity of data that can be exchanged per month—such as one gigabyte. Voice and data might be combined into a single plan which allows both voice and data usage.

One or more telecommunications devices are allowed to participate and utilize the services provided by each subscription plan. The carrier typically provisions or configures each telecommunications device for use on the carrier's network. Part of the configuration process involves linking the telecommunications device to the plan—this is also referred to as "activating" the device. Some carriers use removable Subscriber Identity Modules (SIM cards) to store subscriber information for a particular subscription plan. The SIM card is tied to a particular user account and can be inserted into a device to enable that device to function under the user's account.

Configuration also includes setting various device parameters for the specific characteristics of the carrier's network and the plan under which the telecommunications device will operate. In practice, telecommunications devices are often pre-configured for specific mobile networks.

So-called "family" subscription plans have become popular. A family plan allows multiple devices to share certain features under the umbrella of a single subscription—typically at a significant cost savings. For example, all family devices might share a common pool of voice call minutes. As another example, calls between family devices might not be counted towards monthly allocations of voice call minutes.

Telecommunications network 104 has an administrative component 122 that tracks individual devices, authorizes device access to the network, and limits device usage to the specific features and allocations that are included in the applicable subscription plans. Administrative component 122 keeps track of minutes and data quantities used, provides accounting and billing information, and in some cases provides resources for use by telecommunications devices on network 104. Carrier 120 interacts with the administrative component 122 of telecommunications network 104 to create and configure service plans for individual users and user families.

FIG. 1 illustrates a new type of multi-user subscription plan or feature 130 in which one telecommunications device 132 is designated as a parent device, and another telecommunications device 134 is designated as a child device. The parent device is a normal or specially configured telecommunications device. The child device is a specially configured telecommunications device, with features that allow a user of a parent device 132 to configure the child device 134 remotely, and to thereby control and enhance the activities made accessible via the child device. For example, if a user of parent device 132 wishes the user of child device 134 to be able to initiate telephone calls to a particular telephone number (for example, to a grandparent's telephone number), the user of parent device 132 may initiate a command via the parent device 132, or via an alternate interface on a desktop computer, etc., permitting the child device 134 to access such telephone number. The child device 134, upon receiving the command, may create a unique icon featuring a photographic image of the grandparent in a touchscreen display which, when touched by the user of child device 134, initiates a telephone call to the grandparent's phone number. The child device 134 is thus dependent upon parent device 132 to prescribe its functionality.

In one embodiment, child device 132 may be a specialized smart phone or other device, designed especially for young children. For example, it might have large keys, bright colors, and be ruggedized to withstand the rough treatment it might receive by children. Furthermore, the operating system and user interface of the child device might be customized for young children through simplification and graphical designs that are more appealing and understandable to children.

In one embodiment, child device 132 might be a tablet-like device having dimensions similar to those of an 8½×11 inch sheet of paper. Rather than keys, such a device might have a touch-sensitive display surface to accept user input.

Figure 2:
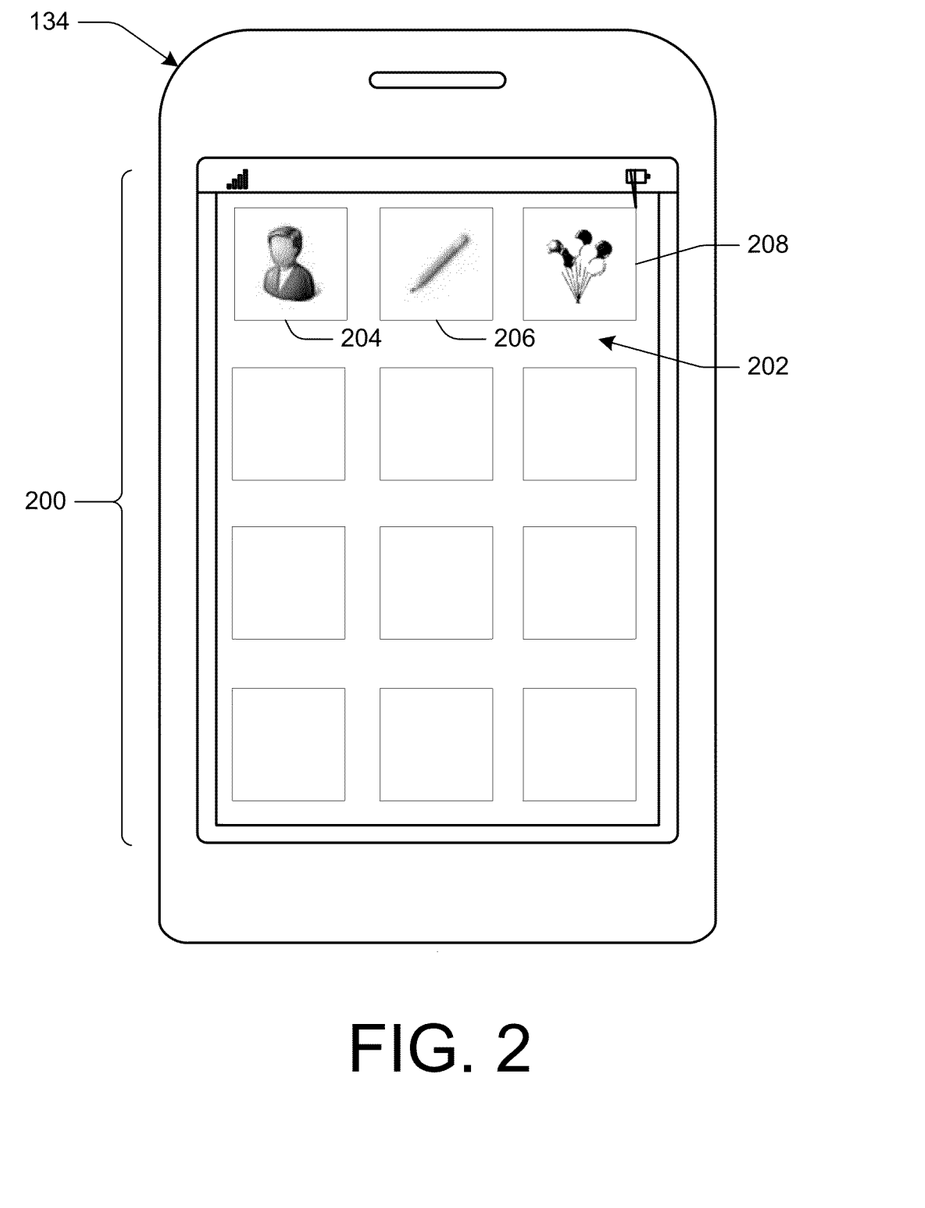
FIG. 2 is an illustration of a child device user interface.

FIG. 2 shows an example of a simplified graphical interactive user interface 200 for such a device, configured to offer a variety of activities to a user of the child device 134. User interface 200 in this embodiment comprises one or more graphical menus 202 that provide access by the user of the child device 134 to different activities that a user might engage in through the device, such as executing applications and initiating voice calls. The menu shown in FIG. 2 has a plurality of graphical icons, corresponding to the different activities available to the user of child device 134. Icon 204, for example, comprises a picture of a contact (e.g., a parent, a grandparent, or other contact) whom the user of child device 134 might wish to call. In touchscreen implementations, touching the icon initiates a telephone call to the contact. Icon 206 indicates an application for drawing or writing. Touching the icon launches the application which, in this example, would allow the user of child device 134 to draw or write on the touchscreen display. Icon 208 comprises a game that is initiated when the icon is touched. The user of child device 134 can initiate the game by touching or otherwise selecting the game icon.

The activities presented by user interface 200 and available to the user of child device 134 are configurable and customizable. However, such configuration and customization does not take place at the child device 134. Rather, parent device 132 may be configured to remotely configure and customize the specific activities available at child device 134. Moreover, the user of parent device 132 may have alternate interfaces available to configure and customize child device 134, such as a Web interface accessible via any device that accesses the Internet. Specifically, child device configurations settings are specified by the user of parent device 132 and then communicated to child device 134. The configuration settings indicate the activities that are to be made available on the graphical user interface 200 and menu 202 of the child device 134. The child device 134 receives the configuration settings and applies them automatically and without participation of the user of child device 134. This allows the user of parent device 132 to both limit the activities available to the user of child device 134 and to introduce the user to new activities. The user of parent device 132 can change the configuration settings at any time, upon which they are recommunicated to the child device 134 and implemented there to change the activities indicated by the menu 202.

Generally, activities can include telecommunication activities such as voice calls, emails, instant messaging, etc. In addition, the activities can include viewing particular web sites, rendering both local and remote content, and executing applications. In some implementations child device 134 might be configured to load content, including executable applications, onto child device 134 in response to receiving configuration settings indicating activities referring to or designating such content.

In cases where a specified activity is an application that facilitates interactions or communications with users of other devices, such as an instant messaging or chat program, the application program can be configured to limit its interaction to a predetermined set of users. For example, such application programs might be limited to interaction with the parent device. Alternatively, the configuration settings might designate a larger set of users with which the application is allowed to interact. In each case, a user of parent device 132 can identify that, for instance, the user of child device 134 may engage in instant messaging activities with a specific third party, and an icon (in touchscreen implementations) corresponding to instant messaging with the third party may appear on the touchscreen display 202.

Figure 3:
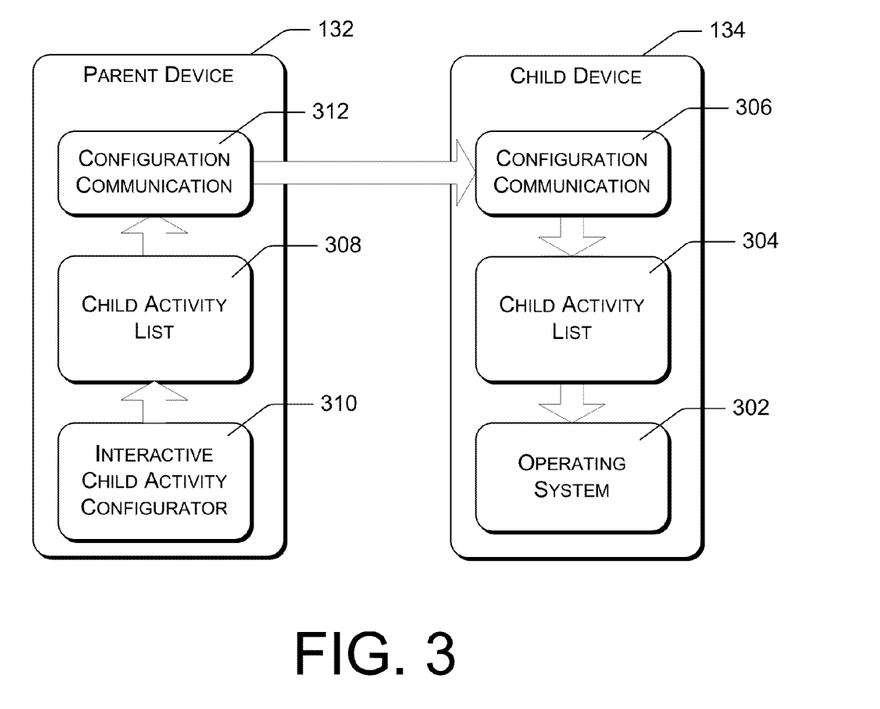
FIG. 3 is a block diagram illustrating how a child device can be configured from a parent device.

FIG. 3 shows one way in which this type of remote configuration might be configured between parent device 132 and child device 134. In this embodiment, the operating system 302 of the child device 134 references an activity list 304 when generating interactive user interface 200. The activity list 304 contains a list of activities that are to be presented on user interface 200 of child device 134. Operating system 302 is configured to limit the activities available to the user of child device 134 to those indicated by activity list 304.

Child device 134 also has a configuration communication component 306 that receives remote configuration information. Configuration communication component 306 is an executable component that may be part of operating system 302 or that may run in conjunction with operating system 302. Communication component 306 is configured to communicate with the device that has been designated as the parent device of child device 134—in this case parent device 132—and to receive remotely generated instructions or configuration settings to add or remove activities from child activity list 304.

Parent device 132 has a corresponding child activity list 308 that is maintained by parent device 132 to designate activities to be made available at child device 134. In addition, parent device 132 has an interactive child device configurator 310 that allows a user of parent device 132 to specify activities for inclusion in the child activity list 304 of child device 134.

Interactive child device configurator 310 in this example is an executable program that runs on parent device 134. Using the user input/output capabilities of parent device 134, child device configurator 310 interacts with the user of parent device 134 allowing the user to specify different activities. The user can specify Internet sites, contacts, applications, pictures, music, games, and other resources to be presented as activities to the user of child device 134. Other information can also be associated with each activity, such as descriptions, telephone numbers, email addresses, resource identifiers, URLs, file locations, and other types of information relevant to each activity.

Parent device 132 also has a configuration communication component 312 that is configured to communicate with child communication component 306 of child device 134. Changes to the activities designated in child activity list 308 on parent device 134 are automatically communicated through communication components 306 and 312 from parent device 132 to child device 134, and the child activity list 304 on child device 134 is updated to mirror the content of the activity list 308 of the parent device 132. In turn, operating system 302 of child device 134 responds to changes in its child activity list 304 by updating its graphical user interface 200 to show the activities currently in the child activity list 304.

This mechanism allows a user of parent device 132 to specify exactly which activities should be exposed to a user of child device 134, and to change those activities from time to time. The user of parent device 132 can add activities corresponding to different contacts, so that the child device 134 displays icons for calling, emailing, or texting specific people, or communicating with them using different types of protocols. Similarly, the user of parent device 132 can specify particular applications to be installed and executed on a child device 134. When an application is specified and included in the child activity list 304 of child device 134, the child device 134 can be configured to automatically download and install it before or in conjunction with creating its icon on the child device's user interface. When the user of child device 134 touches the corresponding icon, the application is already installed and ready to be executed.

Similarly, the user of parent device 132 can designate specific content such as pictures or songs to be downloaded and represented by an icon on the child device 134.

In many cases, the user of parent device 132 can designate desired activities by their Internet URLs (uniform resource allocators) or addresses. Alternatively, the service plan carrier might provide a menu of different activities available from the service plan carrier itself. Applications, in particular, might be made available in this way.

Contacts, pictures, and songs might be designated by selecting from those already present on the parent device 132. For example, the parent device 132 might be configured so that there is an available "share" option when viewing or using different types of objects or resources on the parent device 132. Selecting to "share" a resource results in that resource being made available as an activity on the child device.

Although the configurator is described above as a discrete executable program, its functionality could alternatively be integrated with the operating system of the parent device 132 or even accessed from a server as an Internet application.

Figure 4:
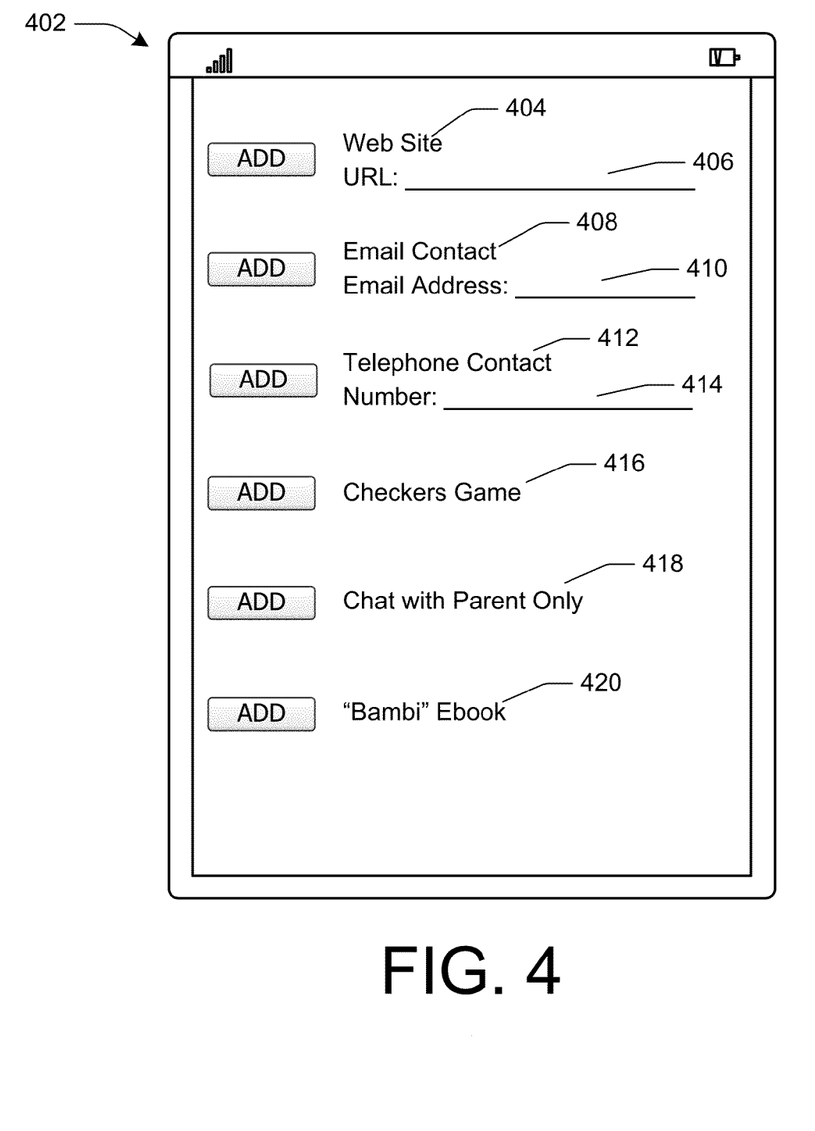
FIG. 4 is an illustration of a parent device configurator user interface.

FIG. 4 shows a simple example of how a user interface 402 of configurator 310 might be implemented on parent device 132. In this example, the configurator is designed to display a menu of different activities that are potentially available to the child device 134. Selecting or pressing the "Add" button next to any of these activities adds that activity to the child activity list.

In this example, a first selectable activity 404 comprises a visiting a web site. Before adding this activity, the user of parent device 132 enters a web URL into the blank space 406. Adding this activity results in a corresponding icon being added to the child device user interface 200, which the user of child device 134 can select to open the web site that the user of parent device 132 has designated.

Another selectable activity 408 comprises emailing a contact. Before adding this activity, the user of parent device 132 enters an email address into the blank space 410. Adding this activity results in a corresponding icon being added to the child device user interface 200, which the user of child device 134 can select to create an email to the designated email address.

Yet another selectable activity 412 comprises placing a voice call to a telephone contact. Before adding this activity, the user of parent device 132 enters a telephone number into the blank space 414. Adding this activity results in a corresponding icon being added to the child device user interface 200, which the user of child device 132 can select to initiate a telephone call to the designated telephone number.

Yet another selectable activity 416 comprises initiating an executable program, in this case a checkers game. Selecting this activity for addition to the child activity list 304 will result in the executable program being downloaded to the child device 134 and represented on the child device 134 by a corresponding icon that the user of child device 134 can select to play the game.

A selectable activity 418 comprises initiating another executable program, in this case an instant messaging or chat program configured to allow communication only with the parent device 132. Selecting this activity will result in the executable program being downloaded to the child device 134 and represented on the child device 134 by a corresponding icon that the user of child device 134 can select to chat with the user of parent device 132.

A selectable activity 420 comprises rendering content, in this case an ebook. Selecting this activity will result in the content being downloaded to the child device 134 and represented on the child device 134 by a corresponding icon that the user of child device 134 can select to open and view the ebook.

Configurator 310 and its user interface might be configured in many different ways to allow more detailed descriptions of activities (such as names and other information for contacts, titles for content, etc.) and for more convenient selection of different activities. For example, activities might be chosen from resources already available on the parent device 132. In order to specify an emailing activity, the user might simply open a contact, select an email address, and select a "share" option. This would add the email address as an activity into child activity list 304. Activities involving applications, content, and other resources could be designated in a similar manner.

As another possibility, applications and content might be chosen from a list that is preconfigured by the service carrier. This would allow the service carrier to create applications and content specially for this purpose. Applications, for example, might be created to facilitate interaction between the user of parent device 132 and the user of child device 134. Games and educational programs might be provided and configured specifically to utilize the various communications options available between the users.

Furthermore, it may be desirable for the user of parent device 132 to specify additional descriptive or limiting information for different activities. For activities involving interaction with other users or devices, for example, the user of parent device 132 might wish to specify a list of specific users or devices with which such interaction will be allowed. Thus, the "checkers game" application might allow users of two different devices to play against each other, and the user of parent device 132 is allowed to specify a list of other users with whom the user of child device 134 is allowed to play.

Figure 5:
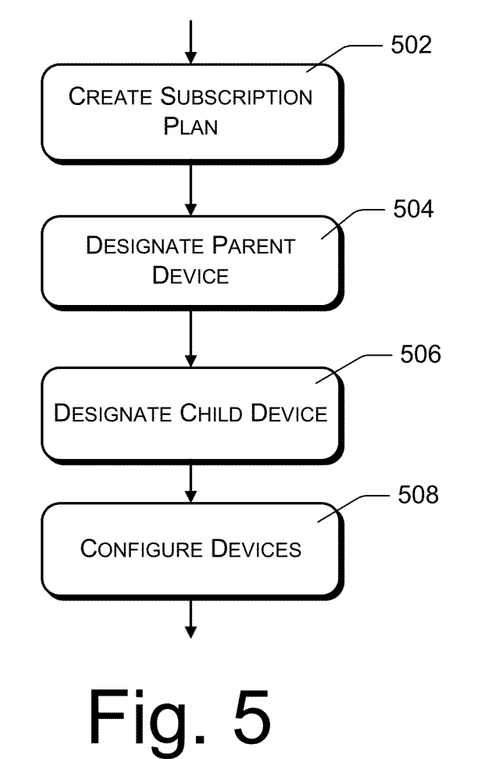
FIG. 5 is a flowchart showing a method of configuring parent and child devices.

FIG. 5 shows an example of actions performed by a carrier to implement the functionality described above. An action 502 comprises creating a subscription plan or feature and associating a set of two or more telecommunication devices with that common subscription plan or feature. An action 504 comprises designating a parent device 132 from among the set of telecommunication devices. An action 506 comprises designating a child device 134 from among the set of telecommunications devices.

A further action 508 comprises configuring the parent device 132 and child device 134 to function as described above. Specifically, the child device 134 is configured to receive configuration settings from the parent device 132 indicating activities for a user of child device 134 to initiate on the child device 134. The child device 134 is further configured to display activity choices that include the indicated activities, and to prevent or disallow activities that are not indicated by the configuration settings. The activities can indicate allowed contacts, remote resources, executable applications, and content. When activities indicate executable applications, the child device 134 can be configured to download and install the applications as necessary. When activities indicate content such as music, pictures, etc., the child device 134 can be configured to download the content and any applications necessary to render the content.

The child device 134 displays activities relating to these resources on a graphical menu or user interface, and disallows other activities or access to resources that are not among the allowed resources. Specifically, the child device 134 disallows (a) communications with parties that are not among the indicated allowed contacts; (b) access to remote resources that are not among the allowed remote resources; (c) execution by the child device 134 of executable applications that are not among the allowed executable applications; and (d) downloading of content other than the allowed content.

Figure 6:
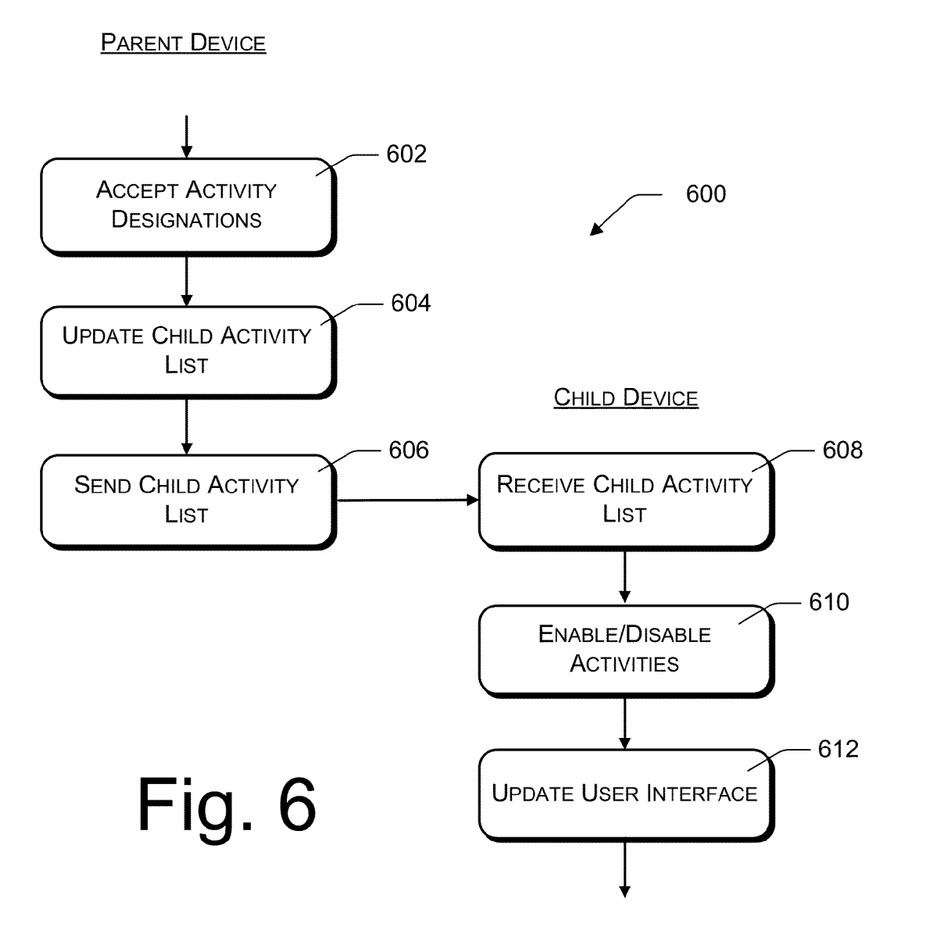
FIG. 6 is a flowchart illustrating a method of configuring a child device from a parent device.

FIG. 6 shows actions performed by the parent device 132 and child device 134. Actions performed by the parent device 132 are shown on the left. Actions performed by the child device 134 are shown on the right.

An action 602 comprises accepting activity designations from a user of the parent device 132. As described above, the user of parent device 132 can choose to share various different types of resources and objects that are already on the parent device itself. Alternatively, the user of parent device 132 can specify resources by their web addresses or other identifying information such as telephone number, email address, etc. As a further alternative, the user of parent device 132 might choose from an activity menu that has been created by the carrier or another entity.

An action 604 comprises updating a child activity list 308 on the parent device 132, in accordance with the designations made in action 602. Specifically, activities are created for each of the designated resources. If a designated resource is a contact, an activity is created to communicate with that contact. If a designated resource is an application, an activity is created for executing that application.

An action 606 comprises sending the child activity list 308 to the device that has been designated as the child device 134.

In an action 608, the child device 134 receives the child activity list 308, which indicates remote configuration information or settings as already described. Note that FIG. 3 designates the child activity list as received by child device 134 by reference numeral 304.

Sending and receiving the child activity list 304/308 can be accomplished in various ways using a variety of protocols. Various "push" protocols exist that allow one device to notify another of a request for information transfer. Alternatively, the child device 134 might be configured to poll for new information at periodic intervals.

Also note that an intermediary such as a server might be used to facilitate transfer of the child activity list 304/308 from the parent device 132 to the child device 134. Thus, the parent device 132 might transmit the child activity list 308 to the server for storage. The child device 134 would then download the information from the intermediary server rather than directly from the parent device 132. This type of arrangement would allow the child activity list 304 to also be configured from devices other than the parent device 132, such as from a computer connected to the Internet.

An action 610, performed by the child device 134, comprises enabling any activities indicated by the received child activity list 304, and disabling any activities not indicated by the received child activity list 304. This includes disabling application that are not indicated as being allowable and disabling voice calls to contacts not indicated by the child activity list 304. This also potentially includes making any downloads and installations that might be prerequisites to the newly specified activities. Specifically, in action 610, if any of the activities indicate or involve executable applications, child device 134 can download and/or install those applications. If any of the activities indicate or involve content such as music, pictures, text, or other types of files, that content can be downloaded and made available on the child device 134.

Action 612, performed by the operating system of the child device, comprises updating the child device's user interface to reflect any changes in the activity list. Specifically, the graphical menu described in FIG. 2 is updated to display icons corresponding to the activities specified in the child activity list 304 received in action 608.

Figure 7:
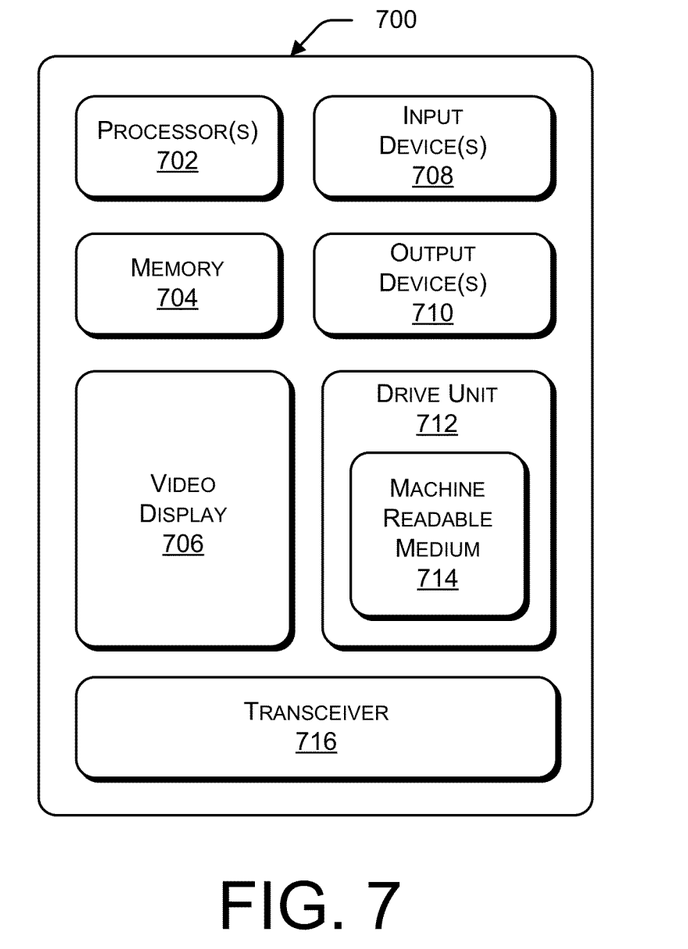
FIG. 7 is a block diagram showing common components of a telecommunications device such as might be used to implement the parent and child devices described herein.

FIG. 7 shows an exemplary telecommunication device 700 such as may be used as either the parent device 132 or the child device 134. Telecommunication device 700 comprises one or more processors 702, a memory 704, a video display 706, one or more input devices 708, one or more output devices 710, a drive unit 712 which can access a machine readable medium 714, and a transceiver 716. The machine readable medium 714 stores one or more sets of instructions (e.g., software) embodying any one or more of the methodologies or functions described herein. The instructions may also reside, completely or at least partially, within the memory 704 and within the processor 702 during execution thereof by the telecommunication device 700. The memory 704 and the processor 702 also may constitute machine-readable media.

In child device 134, for example, the machine-readable memory might include an operating system or other program configured to receive configuration settings and to respond by displaying indicated activities on the video display 706. In some cases, a program for achieving the functionality described above might be loaded onto device 700 by a reseller of the device, such as by a service carrier that bundles the device with a service plan. In other cases, the manufacturer of the device might include the functionality as a native element of the device. Alternatively, the functionality might be part of a program that is installed by an end-user.

In parent device 132, the machine-readable memory might include an operating system or other program configured to interact with a user of parent device 132 to establish the configuration settings and to send those setting for eventual receipt by the child device. Again, this functionality might be included with the native software as the device is manufactured, or added latter by a reseller or an end-user.

The input device 708 may be a keyboard, keypad, touch screen, or microtelecommunications device. Other input devices 708 may be used. The video display 706 may be a liquid crystal display (LCD), a flat panel, a solid state display or other device. The processor 702 may be a central processing unit (CPU), a graphics processing unit (GPU), or both CPU and GPU, or other processing unit or component.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

I claim:

1. A child telecommunications device, comprising:
an interactive user interface that offers activities to a user of the child telecommunications device;
the child telecommunications device being configured to perform actions comprising:
receiving remote configuration information that indicates the activities that are to be available on the child telecommunications device, the indicated activities designating allowed executable applications, allowed communication contacts, and allowed content;
adding the indicated activities to the interactive user interface in response to receiving the remote configuration information; and
removing activities designating communication contacts from the interactive user interface if the communication contacts are not included in the allowed communication contacts of the remote configuration information,
wherein the remote configuration information includes a list of allowable applications and content that is pre-configured by a service provider such that a user of a parent device specifies additional descriptive or limiting information to said list to create the remote configuration information received by the child telecommunications device, the allowable applications and content comprising applications and content that are created by the service provider and enable the child telecommunications device to communicate with the parent telecommunications device.

2. A child telecommunications device as recited in claim 1, the actions further comprising loading resources as needed to enable the indicated activities on the child telecommunications device.

3. A child telecommunications device as recited in claim 1, the actions further comprising removing activities from the interactive user interface if they are not indicated by the remote configuration information.

4. A child telecommunications device as recited in claim 1, wherein the indicated activities designate allowed executable applications, and wherein one or more of the applications facilitate interactions with users of other devices; the actions further comprising limiting interaction by the applications to contacts specified in the remote configuration information.

5. One or more non-transitory computer-readable media containing instructions that are executable on a telecommunications device to perform actions comprising:
   receiving configuration settings from a remote device, the configuration settings indicating activities for a user to initiate on the telecommunications device, the indicated activities designating allowed executable applications, allowed communication contacts, and allowed content;
   adding the indicated activities to a graphical display of activities available on the telecommunications device in response to receiving the configuration settings; and
   removing activities designating communication contacts from the interactive user interface if the communication contacts are not included in the allowed communication contacts of the configuration settings,
   wherein the configuration settings includes a list of allowable applications and content that is preconfigured by a service provider such that a user of a parent device specifies additional descriptive or limiting information to said list to create the remote configuration settings received by the telecommunications device, the allowable applications and content comprising applications and content that are created by the service provider and enable the telecommunications device to communicate with the parent telecommunications device.

6. The one or more non-transitory computer-readable media of claim 5, the actions further comprising configuring the telecommunications device to load resources as needed to enable the indicated activities on the telecommunications device.

7. The one or more non-transitory computer-readable media of claim 5, wherein the actions further comprise disallowing communications by the telecommunications device with parties that are not among the allowed communication contacts.

8. The one or more non-transitory computer-readable media of claim 5, wherein the indicated activities designate allowed remote resources; the actions further comprising disallowing access to remote resources that are not among the allowed remote resources.

9. A method comprising:
   associating, by an administrative component of a telecommunication network, a set of telecommunication devices with a common subscription feature of a subscription for telecommunication services provided by the telecommunication network, the administrative component being separate and distinct from the set of telecommunication devices;
   designating, by the administrative component, a parent device from among the set of telecommunication devices;
   designating, by the administrative component, a child device from among the set of telecommunication devices;
   configuring, by the administrative component, the parent device to accept configuration settings for the child device from a user of the parent device, the configuration settings indicating activities for a child to initiate on the child device, the indicated activities designating allowed executable applications, allowed communication contacts, and allowed content;
   configuring, by the administrative component, the child device to receive the configuration settings; and
   further configuring, by the administrative component, the child device to present one or more graphical menus on the child device in response to the received configuration settings, the one or more graphical menus showing the activities indicated by the configuration settings, and to remove activities designating communication contacts from the interactive user interface if the communication contacts are not included in the allowed communication contacts of the remote configuration settings,
   wherein the configuration settings includes a list of allowable applications and content that is preconfigured by a service provider such that the user of the parent device specifies additional descriptive or limiting information to said list to create the remote configuration settings received by the child device, the allowable applications and content comprising applications and content that are created by the service provider and enable the child device to communicate with the parent device.

10. The method of claim 9, further comprising:
    configuring the child device to limit access by the child device to the activities indicated by the configuration settings.

11. The method of claim 9, wherein the activities comprise rendering remote content.

12. The method of claim 9, wherein the activities comprise viewing a web site.

13. The method of claim 9, wherein the activities comprise executing an application on the child device.

14. The method of claim 9, further comprising configuring the child device to respond to changes in the configuration settings by changing the activities shown on the one or more graphical menus.

15. The method of claim 9, further comprising configuring the child device to load content onto the child device in response to receiving configuration settings indicating an activity associated with such content.

16. The method of claim 9, further comprising configuring the child device to load an application onto the child device in response to receiving configuration settings indicating an activity associated with the application.

17. The child telecommunications device as recited in claim 1, the actions further comprising automatically downloading the executable application or content in response to receiving the remote configuration information.

18. The one or more tangible computer-readable storage media as recited in claim 5, the actions further comprising automatically downloading the executable application or content in response to receiving the configuration settings.

* * * * *